United States Patent
Morris et al.

(10) Patent No.: US 9,067,625 B2
(45) Date of Patent: Jun. 30, 2015

(54) ELASTIC RETAINING ARRANGEMENT FOR JOINTED COMPONENTS AND METHOD OF REDUCING A GAP BETWEEN JOINTED COMPONENTS

(71) Applicant: GM GLOBAL TECHNOLGOY OPERATIONS LLC, Detroit, MI (US)

(72) Inventors: Steven E. Morris, Fair Haven, MI (US); James M. Kushner, Macomb, MI (US); Victoria L. Enyedy, Troy, MI (US); Jennifer P. Lawall, Waterford, MI (US); Piotr J. Ogonek, Casco Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 9 days.

(21) Appl. No.: 13/859,109

(22) Filed: Apr. 9, 2013

(65) Prior Publication Data

US 2014/0300130 A1    Oct. 9, 2014

(51) Int. Cl.
*B62D 27/04* (2006.01)
*B62D 27/02* (2006.01)
(Continued)

(52) U.S. Cl.
CPC ......... *B62D 27/023* (2013.01); *Y10T 403/7039* (2015.01); *F16B 5/0032* (2013.01); *F16B 5/0056* (2013.01); *F16B 5/0657* (2013.01); *F16B 19/002* (2013.01)

(58) Field of Classification Search
CPC .............................. B62D 27/023; F16B 5/0032
USPC .......................... 24/297; 296/97.23, 1.08, 209
See application file for complete search history.

(56) References Cited

U.S. PATENT DOCUMENTS 1,301,302 A    4/1919 Nolan
1,819,126 A    8/1931 Scheibe
(Continued)

FOREIGN PATENT DOCUMENTS

CN    1129162 A    8/1996
CN    2888807 Y    4/2007
(Continued)

OTHER PUBLICATIONS

Cross-sectional view of a prior art infrared welded assembly of BMW, Munich, Germany. Believed on the market since about Jan. 1, 2010.
(Continued)

*Primary Examiner* — Dennis H Pedder
(74) *Attorney, Agent, or Firm* — Cantor Colburn LLP

(57) ABSTRACT

A retaining arrangement includes a first component having a first main body portion and a first interface edge. Also included is a second component operatively coupled to the first component, the second component comprising a second main body portion, a second interface edge in contact with the first interface edge, and an end portion in an overlapped configuration with the first main body portion of the first component. Further included is an aperture defined by an aperture wall and extending through the end portion of the second component. Yet further included is an elastically deformable protrusion extending away from the first main body portion of the first component, the elastically deformable protrusion configured to fittingly engage the aperture proximate an end region of the aperture wall, wherein the elastically deformable protrusion is formed of an elastically deformable material and configured to elastically deform upon engagement with the aperture wall.

13 Claims, 5 Drawing Sheets

(51) Int. Cl.
 *F16B 5/00* (2006.01)
 *F16B 5/06* (2006.01)
 *F16B 19/00* (2006.01)

(56) References Cited

U.S. PATENT DOCUMENTS

| | | | |
|---|---|---|---|
| 1,982,076 A | 11/1934 | Spahn | |
| 2,006,525 A | 7/1935 | Bernhard | |
| 2,482,488 A | 9/1949 | Franc | |
| 2,688,894 A | 9/1954 | Modrey | |
| 2,778,399 A | 1/1957 | Mroz | |
| 2,780,128 A | 2/1957 | Rapata | |
| 2,862,040 A | 11/1958 | Curran | |
| 2,902,902 A | 9/1959 | Slone | |
| 3,005,282 A | 10/1961 | Christiansen | |
| 3,014,563 A | 12/1961 | Bratton | |
| 3,087,352 A | 4/1963 | Daniel | |
| 3,130,512 A | 4/1964 | Van Buren, Jr. | |
| 3,168,961 A | 2/1965 | Yates | |
| 3,194,292 A | 7/1965 | Borowsky | |
| 3,213,189 A | 10/1965 | Mitchell et al. | |
| 3,233,358 A | 2/1966 | Dehm | |
| 3,233,503 A | 2/1966 | Birger | |
| 3,244,057 A | 4/1966 | Mathison | |
| 3,531,850 A | 10/1970 | Durand | |
| 3,643,968 A | 2/1972 | Horvath | |
| 3,842,565 A * | 10/1974 | Brown et al. | 52/717.05 |
| 3,895,408 A | 7/1975 | Leingang | |
| 3,905,570 A | 9/1975 | Nieuwveld | |
| 4,158,511 A | 6/1979 | Herbenar | |
| 4,213,675 A | 7/1980 | Pilhall | |
| 4,394,853 A | 7/1983 | Lopez-Crevillen et al. | |
| 4,406,033 A | 9/1983 | Chisholm et al. | |
| 4,481,160 A | 11/1984 | Bree | |
| 4,605,575 A | 8/1986 | Auld et al. | |
| 4,767,647 A | 8/1988 | Bree | |
| 4,805,272 A | 2/1989 | Yamaguchi | |
| 5,139,285 A | 8/1992 | Lasinski | |
| 5,234,122 A | 8/1993 | Cherng | |
| 5,397,206 A | 3/1995 | Sihon | |
| 5,507,610 A | 4/1996 | Benedetti et al. | |
| 5,513,603 A | 5/1996 | Ang et al. | |
| 5,524,786 A | 6/1996 | Skudlarek | |
| 5,538,079 A | 7/1996 | Pawlick | |
| 5,577,301 A | 11/1996 | DeMaagd | |
| 5,577,779 A | 11/1996 | Dangel | |
| 5,580,204 A | 12/1996 | Hultman | |
| 5,601,453 A | 2/1997 | Horchler | |
| 5,634,757 A | 6/1997 | Schanz | |
| 5,698,276 A | 12/1997 | Mirabitur | |
| 5,736,221 A | 4/1998 | Hardigg et al. | |
| 5,806,915 A | 9/1998 | Takabatake | |
| 5,810,535 A | 9/1998 | Fleckenstein et al. | |
| 5,941,673 A | 8/1999 | Hayakawa et al. | |
| 6,193,430 B1 | 2/2001 | Culpepper et al. | |
| 6,209,178 B1 | 4/2001 | Wiese et al. | |
| 6,264,869 B1 | 7/2001 | Notarpietro et al. | |
| 6,321,495 B1 | 11/2001 | Oami | |
| 6,354,815 B1 | 3/2002 | Svihla et al. | |
| 6,378,931 B1 | 4/2002 | Kolluri et al. | |
| 6,398,449 B1 | 6/2002 | Loh | |
| 6,484,370 B2 * | 11/2002 | Kanie et al. | 24/297 |
| 6,485,241 B1 | 11/2002 | Oxford | |
| 6,533,391 B1 | 3/2003 | Pan | |
| 6,568,701 B1 | 5/2003 | Burdack et al. | |
| 6,579,397 B1 | 6/2003 | Spain et al. | |
| 6,591,801 B1 | 7/2003 | Fonville | |
| 6,609,717 B2 | 8/2003 | Hinson | |
| 6,677,065 B2 | 1/2004 | Blauer | |
| 6,840,969 B2 | 1/2005 | Kobayashi et al. | |
| 6,857,676 B2 | 2/2005 | Kawaguchi et al. | |
| 6,932,416 B2 | 8/2005 | Clauson | |
| 6,948,753 B2 * | 9/2005 | Yoshida et al. | 296/1.08 |
| 6,959,954 B2 | 11/2005 | Brandt et al. | |
| 6,971,831 B2 | 12/2005 | Fattori et al. | |
| 7,008,003 B1 | 3/2006 | Hirose et al. | |
| 7,014,094 B2 | 3/2006 | Alcoe | |
| 7,036,779 B2 | 5/2006 | Kawaguchi et al. | |
| 7,089,998 B2 | 8/2006 | Crook | |
| 7,178,855 B2 | 2/2007 | Catron et al. | |
| 7,198,315 B2 | 4/2007 | Cass et al. | |
| 7,306,418 B2 | 12/2007 | Kornblum | |
| 7,322,500 B2 | 1/2008 | Maierholzner | |
| 7,344,056 B2 | 3/2008 | Shelmon et al. | |
| 7,557,051 B2 | 7/2009 | Ryu et al. | |
| D602,349 S | 10/2009 | Andersson | |
| 7,764,853 B2 | 7/2010 | Yi et al. | |
| 7,793,998 B2 | 9/2010 | Matsui et al. | |
| 7,802,831 B2 | 9/2010 | Isayama et al. | |
| 7,828,372 B2 | 11/2010 | Ellison | |
| 7,862,272 B2 | 1/2011 | Nakajima | |
| 7,883,137 B2 | 2/2011 | Bar | |
| 8,061,861 B2 | 11/2011 | Paxton et al. | |
| 8,101,264 B2 | 1/2012 | Pace et al. | |
| 8,136,819 B2 | 3/2012 | Yoshitsune et al. | |
| 8,162,375 B2 | 4/2012 | Gurtatowski et al. | |
| 8,261,581 B2 | 9/2012 | Cerruti et al. | |
| 8,297,137 B2 | 10/2012 | Dole | |
| 8,444,199 B2 | 5/2013 | Takeuchi et al. | |
| 8,695,201 B2 | 4/2014 | Morris | |
| 2002/0045086 A1 | 4/2002 | Tsuji et al. | |
| 2002/0092598 A1 | 7/2002 | Jones et al. | |
| 2002/0136617 A1 | 9/2002 | Imahigashi | |
| 2003/0082986 A1 | 5/2003 | Wiens et al. | |
| 2003/0087047 A1 | 5/2003 | Blauer | |
| 2003/0108401 A1 | 6/2003 | Agha et al. | |
| 2003/0180122 A1 | 9/2003 | Dobson | |
| 2004/0131896 A1 | 7/2004 | Blauer | |
| 2004/0139678 A1 | 7/2004 | Pervan | |
| 2004/0208728 A1 | 10/2004 | Fattori et al. | |
| 2005/0031946 A1 | 2/2005 | Kruger et al. | |
| 2005/0244250 A1 | 11/2005 | Okada et al. | |
| 2006/0102214 A1 | 5/2006 | Clemons | |
| 2006/0141318 A1 | 6/2006 | MacKinnon et al. | |
| 2006/0197356 A1 | 9/2006 | Catron et al. | |
| 2007/0144659 A1 | 6/2007 | De La Fuente | |
| 2007/0292205 A1 | 12/2007 | Duval | |
| 2008/0094447 A1 | 4/2008 | Drury et al. | |
| 2008/0217796 A1 | 9/2008 | Van Bruggen et al. | |
| 2008/0260488 A1 | 10/2008 | Scroggie et al. | |
| 2009/0134652 A1 | 5/2009 | Araki | |
| 2009/0174207 A1 | 7/2009 | Lota | |
| 2010/0021267 A1 | 1/2010 | Nitsche | |
| 2010/0102538 A1 | 4/2010 | Paxton et al. | |
| 2010/0270745 A1 | 10/2010 | Hurlbert et al. | |
| 2011/0076588 A1 | 3/2011 | Yamaura | |
| 2011/0207024 A1 | 8/2011 | Bogumil et al. | |
| 2011/0296764 A1 | 12/2011 | Sawatani et al. | |
| 2012/0115010 A1 | 5/2012 | Smith et al. | |
| 2013/0019454 A1 | 1/2013 | Colombo et al. | |
| 2013/0019455 A1 | 1/2013 | Morris | |
| 2013/0157015 A1 | 6/2013 | Morris | |
| 2013/0287992 A1 | 10/2013 | Morris | |
| 2014/0033493 A1 | 2/2014 | Morris et al. | |
| 2014/0041176 A1 | 2/2014 | Morris | |
| 2014/0041185 A1 | 2/2014 | Morris et al. | |
| 2014/0041199 A1 | 2/2014 | Morris | |
| 2014/0042704 A1 | 2/2014 | Polewarczyk | |
| 2014/0047691 A1 | 2/2014 | Colombo et al. | |
| 2014/0047697 A1 | 2/2014 | Morris | |
| 2014/0080036 A1 | 3/2014 | Smith et al. | |
| 2014/0208561 A1 | 7/2014 | Colombo et al. | |
| 2014/0208572 A1 | 7/2014 | Colombo et al. | |
| 2014/0292013 A1 | 10/2014 | Colombo et al. | |
| 2014/0298638 A1 | 10/2014 | Colombo et al. | |
| 2014/0298640 A1 | 10/2014 | Morris et al. | |
| 2014/0298962 A1 | 10/2014 | Morris et al. | |
| 2014/0301103 A1 | 10/2014 | Colombo et al. | |
| 2014/0301777 A1 | 10/2014 | Morris et al. | |
| 2014/0301778 A1 | 10/2014 | Morris et al. |

(56) References Cited

U.S. PATENT DOCUMENTS

FOREIGN PATENT DOCUMENTS

| CN | 2915389 Y | 6/2007 |
|---|---|---|
| CN | 101250964 A | 4/2008 |
| CN | 201268336 Y | 7/2009 |
| CN | 201703439 U | 1/2011 |
| CN | 201737062 U | 2/2011 |
| CN | 201792722 U | 4/2011 |
| CN | 202079532 U | 12/2011 |
| DE | 3704190 A1 | 12/1987 |
| DE | 3711696 A1 | 10/1988 |
| DE | 3805693 A1 | 2/1989 |
| DE | 69600357 T2 | 12/1998 |
| DE | 10234253 B3 | 4/2004 |
| DE | 102008005618 A1 | 7/2009 |
| DE | 102010028323 A1 | 11/2011 |
| DE | 102011050003 A1 | 10/2012 |
| EP | 0118796 | 9/1984 |
| EP | 1132263 A1 | 9/2001 |
| EP | 1273766 A1 | 1/2003 |
| EP | 1293384 A2 | 3/2003 |
| EP | 2450259 A1 | 5/2012 |
| JP | 2001171554 A | 6/2001 |
| JP | 2005268004 | 9/2005 |
| JP | 2006205918 | 8/2006 |
| JP | 2009084844 | 4/2009 |
| WO | 2008140659 A1 | 11/2008 |

OTHER PUBLICATIONS

"Elastic Averaging in Flexture Mechanisms: A Multi-Beam Paralleaogram Flexture Case-Study" by Shorya Awatar and Edip Sevincer, Proceedings of IDETC/CIE 2006, Paper DETC2006-99752, American Society of Mechanical Engineers (ASME), Sep. 2006.

"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, vol. 26, No. 3, Elsevier Publishing, Jul. 2002.

"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.

"Passive Alignment of Micro-Fluidic Chips Using the Principle of Elastic Averaging" by Sitanshu Gurung, Thesis, Louisiana State University, Dept. of Mechanical Engineering, Dec. 2007.

"Precision Connector Assembly Using Elastic Averaging" by Patrick J. Willoughby and Alexander H. Slocum, Massachusetts Institute of Technology (MIT), Cambridge, MA, American Society for Precision Engineering, 2004.

U.S. Appl. No. 13/229,926, filed Sep. 12, 2011, entitled "Using Elastic Averaging for Alignment of Battery Stack, Fuel Cell Stack, or Other Vehicle Assembly", inventors: Mark A. Smith, Ronald Daul, Xiang Zhao, David Okonski, Elmer Santos, Lane Lindstrom, and Jeffrey A. Abell.

U.S. Appl. No. 13/330,718, filed Dec. 20, 2011, entitled "Precisely Locating Components in an Infrared Welded Assembly", inventor: Steven E. Morris.

U.S. Appl. No. 13/459,118, filed Apr. 28, 2012, entitled "Stiffened Multi-Layer Compartment Door Assembly Utilizing Elastic Averaging," inventor: Steven E. Morris.

U.S. Appl. No. 13/567,580, filed Aug. 6, 2012, entitled "Semi-Circular Alignment Features of an Elastic Averaging Alignment System", inventors: Steven E. Morris and Thomas F. Bowles.

U.S. Appl. No. 13/570,959, filed Aug. 9, 2012, entitled "Elastic Cantilever Beam Alignment System for Precisely Aligning Components", inventor: Steven E. Morris.

U.S. Appl. No. 13/571,030, filed Aug. 9, 2012, entitled "Elastic Tube Alignment System for Precisely Locating an Emblem Lens to an Outer Bezel", inventors: Joel Colombo, Steven E. Morris, and Michael D. Richardson.

U.S. Appl. No. 13/851,222, filed Mar. 27, 2013, entitled "Elastically Averaged Alignment System ", inventors: Joel Colombo and Steven E. Morris.

U.S. Appl. No. 13/855,928, filed Apr. 3, 2013, entitled "Elastic Averaging Alignment System, Method of Making the Same and Cutting Punch Therefor ", inventors: Steven E. Morris, Jennifer P. Lawall, Joel Colombo, and Jeffrey L. K.

U.S. Appl. No. 13/856,888, filed Apr. 4, 2013, entitled "Elastic Retaining Assembly for Matable Components and Method of Assembling", inventors: Steven E. Morris, Jennifer P. Lawall, Joel Colombo, and Toure D. Lee.

U.S. Appl. No. 13/856,927, filed Apr. 4, 2013, entitled "Elastic Tubular Attachment Assembly for Mating Components and Method of Mating Components ", inventors: Steven E. Morris and Jennifer P. Lawall.

U.S. Appl. No. 13/856,956, filed Apr. 4, 2013, entitled "Elastic Clip Retaining Arrangement and Method of Mating Structures with an Elastic Clip Retaining Arrangement ", inventors: Joel Colombo, Steven E. Morris and Jeffrey L. Kon.

U.S. Appl. No. 13/856,973, filed Apr. 4, 2013, entitled "Elastically Deformable Flange Locator Arrangement and Method of Reducing Positional Variation ", inventors: Joel Colombo, Steven E. Morris and Michael D. Richardson.

U.S. Appl. No. 13/858,478, filed Apr. 8, 2013, entitled "Elastic Mating Assembly and Method of Elastically Assembling Matable Components", inventors: Steven E. Morris and Jennifer P. Lawall.

"Coupling Types-Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

* cited by examiner

ELASTIC RETAINING ARRANGEMENT FOR JOINTED COMPONENTS AND METHOD OF REDUCING A GAP BETWEEN JOINTED COMPONENTS

FIELD OF THE INVENTION

The invention relates to components which are to be mated together, and more particularly to an elastic retaining arrangement for jointed components, as well as a method of reducing a joint gap between jointed components.

BACKGROUND

Currently, components which are to be mated together in a manufacturing process are subject to positional variation based on the mating arrangements between the components. One common arrangement includes components mutually located with respect to each other by 2-way and/or 4-way male alignment features; typically undersized male structures which are received into corresponding oversized female alignment features such as apertures in the form of openings and/or slots. Alternatively, double-sided tape, adhesives or welding processes may be employed to mate parts. Irrespective of the precise mating arrangement, there is a clearance between at least a portion of the alignment features which is predetermined to match anticipated size and positional variation tolerances of the mating features as a result of manufacturing (or fabrication) variances. As a result, occurrence of significant positional variation between the mated components is possible, which may contribute to the presence of undesirably large and varying gaps and otherwise poor fit. The clearance between the aligning and attaching features may lead to relative motion between mated components, which may contribute to poor perceived quality. Additional undesirable effects may include squeaking and rattling of the mated components, for example.

SUMMARY OF THE INVENTION

In one exemplary embodiment, a retaining arrangement for jointed components includes a first component having a first main body portion and a first interface edge. Also included is a second component operatively coupled to the first component, the second component comprising a second main body portion, a second interface edge in contact with the first interface edge, and an end portion in an overlapped configuration with the first main body portion of the first component. Further included is an aperture defined by an aperture wall and extending through the end portion of the second component. Yet further included is an elastically deformable protrusion extending away from the first main body portion of the first component, the elastically deformable protrusion configured to fittingly engage the aperture proximate an end region of the aperture wall, wherein the elastically deformable protrusion is formed of an elastically deformable material and configured to elastically deform upon engagement with the aperture wall.

In another exemplary embodiment, a method of reducing a gap between jointed components is provided. The method includes positioning a first interface edge of a first component in close proximity with a second interface edge of a second component. The method also includes engaging at least one elastically deformable protrusion extending from a first main body portion of the first component with at least one plurality of aperture defined by an aperture wall and extending through an end portion of the second component, wherein the engagement is proximate an end region of the aperture wall. The method further includes elastically deforming the at least one elastically deformable protrusion upon engagement of the at least one elastically deformable protrusion with the at least one aperture. The method yet further includes engaging the first interface edge and the second interface edge into a tight, fitted engagement.

In yet another exemplary embodiment, automobile carpet retainer and pillar arrangement includes a first trim component having a first main body portion and a first interface edge. Also included is a second trim component operatively coupled to the first trim component, the second trim component comprising a second main body portion, a second interface edge in contact with the first interface edge, and an end portion in an overlapped configuration with the first main body portion of the first trim component. Further included is an aperture extending through the end portion of the second trim component and defined by an aperture wall. Yet further included is an elastically deformable protrusion extending from the first main body portion of the first trim component, the elastically deformable protrusion configured to fittingly engage the aperture proximate an end region of the aperture wall, wherein the elastically deformable protrusion is formed of an elastically deformable material and configured to elastically deform upon engagement with the aperture wall.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
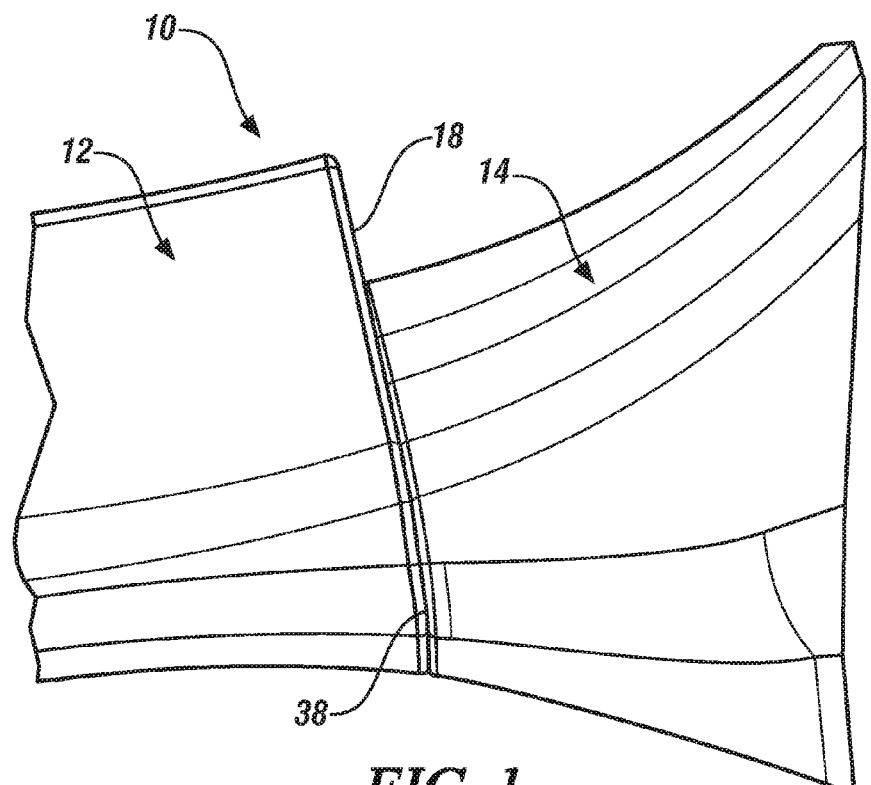
FIG. 1 is a perspective view of jointed components comprising a first component and a second component.

Referring to FIG. 1, a jointed assembly 10 is illustrated. The jointed assembly 10 comprises components configured to be engaged or mated with each other, such as a first component 12 and a second component 14. The jointed assembly 10 may be associated with numerous applications and industries, such as home appliance and aerospace applications, for example. In one embodiment, the jointed assembly 10 is employed in a vehicle, such as an automobile. In an automobile embodiment, the jointed assembly 10 may comprise a carpet retainer and hinge pillar or "B" pillar trim that is located proximate a door opening and a floorboard. As will be appreciated from the description herein, embodiments of the jointed assembly 10 may be used in any application that benefits from a reduction or elimination of a gap at a joint between mated or engaged components.

Figure 2:
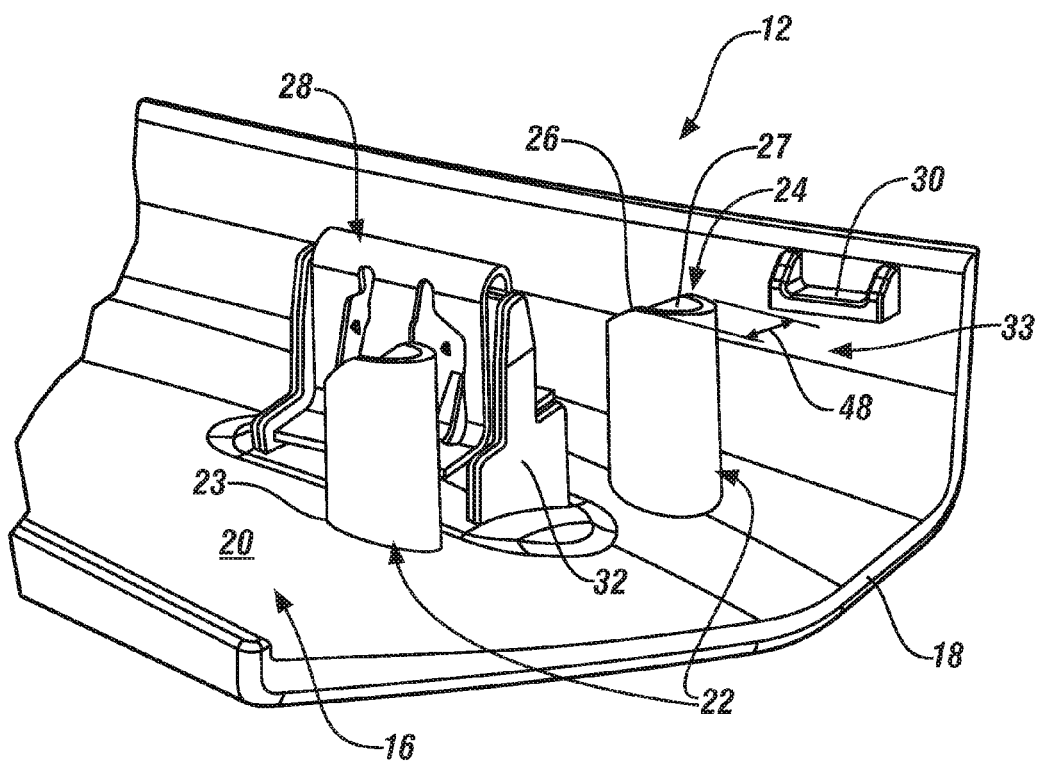
FIG. 2 is a perspective view of the first component.

Referring to FIG. 2, the first component 12 includes a first main body portion 16 that extends to a terminal location defined by a first interface edge 18. As described in detail below, the first interface edge 18 is configured to abut the second component 14 in a tight, fitted engagement to form a joint, and thereby the jointed assembly 10. The first main body portion 16 comprises a main face 20 that spans an inner portion of the first main body portion 16. Extending from the main face 20 is at least one, but typically a plurality of elastically deformable protrusions 22. Each of the plurality of elastically deformable protrusions 22 are operatively coupled to the main face 20 and may be integrally formed with the first component 12. The elastically deformable protrusions 22 extend from a proximate end 23 adjacent the main face 20 to a distal end 24, with a sloped region 26 at the distal end 24. As illustrated, the elastically deformable protrusions 22 are tubular members with a hollow portion 27 therein. The tubular nature of the elastically deformable protrusions 22 enhances deformability of the elastically deformable protrusions 22 during engagement with the second component 14, which will be appreciated from the description below. The elastically deformable protrusions 22 may be formed of numerous geometries, including circular or triangular, for example. Although illustrated and described as tubular members, it is contemplated that the elastically deformable protrusions 22 are formed as solid members lacking the hollow portion 27.

In one embodiment, the first component 12 also includes a first clip 28 and a second clip 30. The first clip 28 is directly or indirectly coupled to or formed with the main face 20 of the first component 12. More particularly, the first clip 28 may be a single structure extending from the main face 20 or may be indirectly coupled to the main face 20 via a stand 32. The second clip 30 extends inwardly from a sidewall 33 of the first main body portion 16. Both the first clip 28 and the second clip 30 are employed to provide retention of the second component 14 to the first component 12. As will be described in detail below, the first clip 28 and the second clip 30 provide retention forces, however, it is to be appreciated that the first clip 28 may be omitted from certain embodiments and that more than one of the second clip 30 may be employed.

Figure 3:
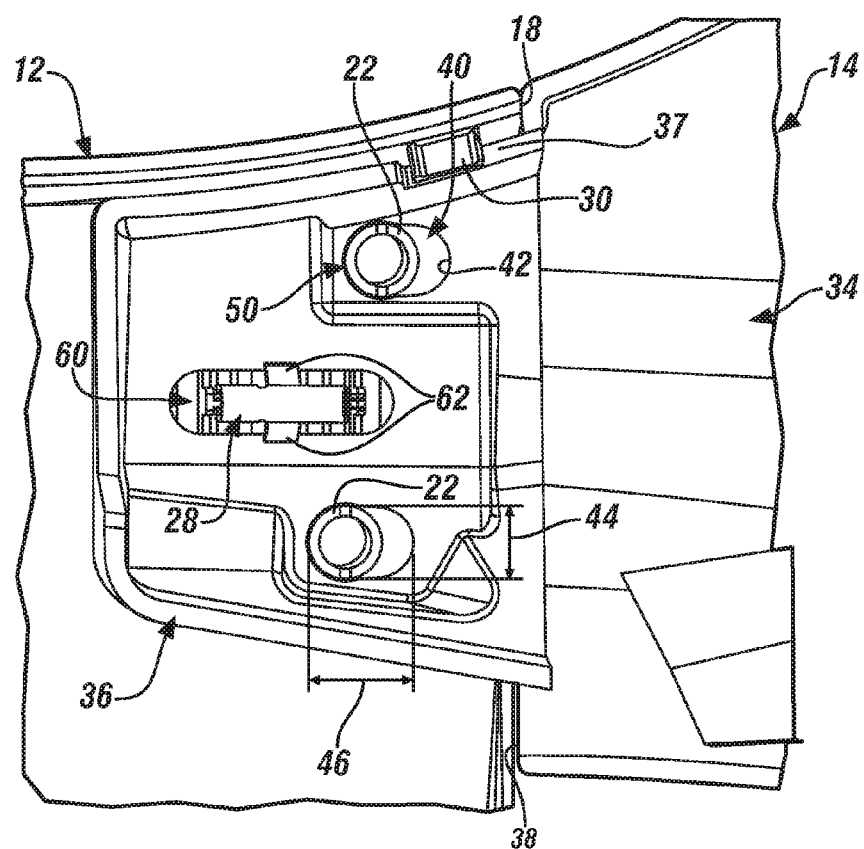
FIG. 3 is an elevational view of the first component and the second component in an engaged position.
Figure 4:
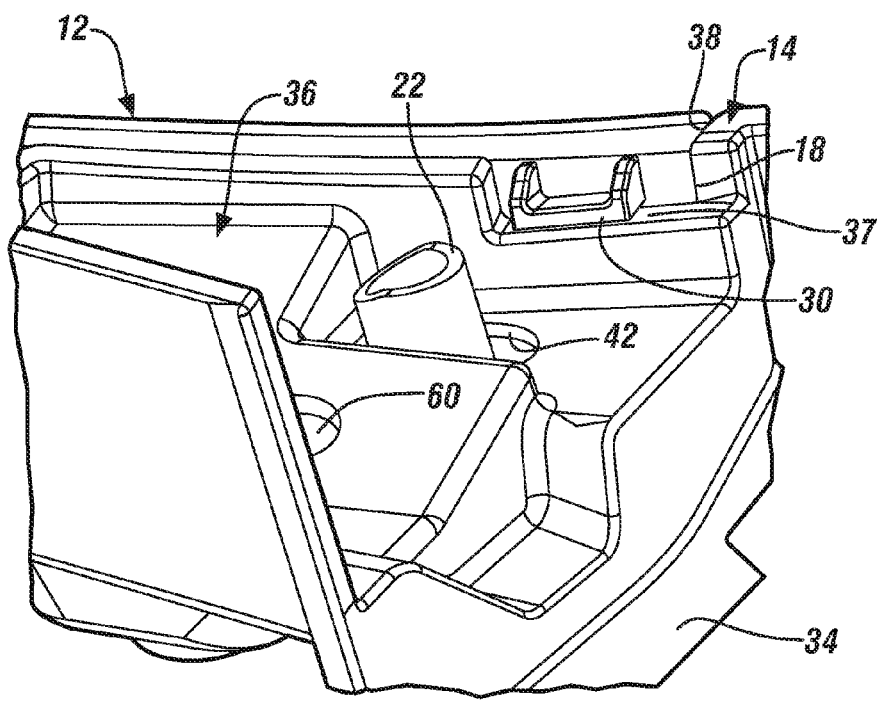
FIG. 4 is a perspective view of the first component and the second component in the engaged position.

Referring to FIGS. 3 and 4, the second component 14 is illustrated in greater detail and is shown in an engaged position with the first component 12. The second component 14 includes a second main body portion 34 and an end portion 36. The end portion 36 is located in a slightly offset plane as that of the second main body portion 34. In this way, the end portion 36 is configured to engage the first component 12 in an overlapping configuration, while allowing the second main body portion 34 to abut the first component 12. Specifically, the second main body portion 34 includes a second interface edge 38 that tightly engages the first interface edge 18 in a fully engaged condition of the first component 12 and the second component 14, thereby forming a joint between the components.

In the engaged position, each of the elastically deformable protrusions 22 are substantially disposed within a corresponding aperture 40 of the second component 14. A single aperture or a plurality of apertures may be present, depending on the number of protrusions included. The aperture 40 extends through the end portion 36 and is defined by an aperture wall 42 formed within the end portion 36 of the second component 14. As shown, the number of apertures included corresponds to the number of elastically deformable protrusions. The aperture 40 may take on various geometries, but typically an elongated slot is included. The aperture 40 comprises an aperture width 44 and an aperture length 46. Similarly, the elastically deformable protrusions 22 each include a protrusion width 48 (FIG. 2) that is greater than the aperture width 44. This sizing relationship ensures that deformation of the elastically deformable protrusions 22 occurs upon insertion into the aperture and upon engagement with the aperture wall 42. As described above, each elastically deformable protrusion 22 includes the sloped region 26 at the distal end 24, thereby providing a "lead-in" surface that facilitates insertion of the elastically deformable protrusions 22 into the apertures 40. It is contemplated that a lead-in feature is not necessary to facilitate insertion.

The elastically deformable protrusions 22 are aligned with the apertures 40 proximate an end region 50 of the apertures 40 and may be slightly offset therefrom prior to insertion of the elastically deformable protrusions 22. Upon insertion, an interference condition is established between the elastically deformable protrusions 22 and the apertures 40. The elastically deformable protrusions 22 are positioned proximate the end region 50 to impart a retaining force on elastically deformable protrusions 22. More particularly, respective force vector components 52 (FIG. 5) in a direction 54 toward the second component 14 result in a tight, fitted engagement between the first interface edge 18 and the second interface edge 38. Such an engagement reduces or eliminates gaps otherwise present due to positional errors and tolerances. Biasing of the first component 12 toward the second component 14 via the force vector components 52 reduces or eliminates gaps that would otherwise be present between the first interface edge 18 and the second interface edge 38. As shown in the force diagram of FIG. 5, the sum of the force vector components 52 is equal to an opposing total force distribution 56 exerted by the second interface edge 38 on the first interface edge 18, which can be expressed as $\Sigma F_A = F_B$.

Figure 5:
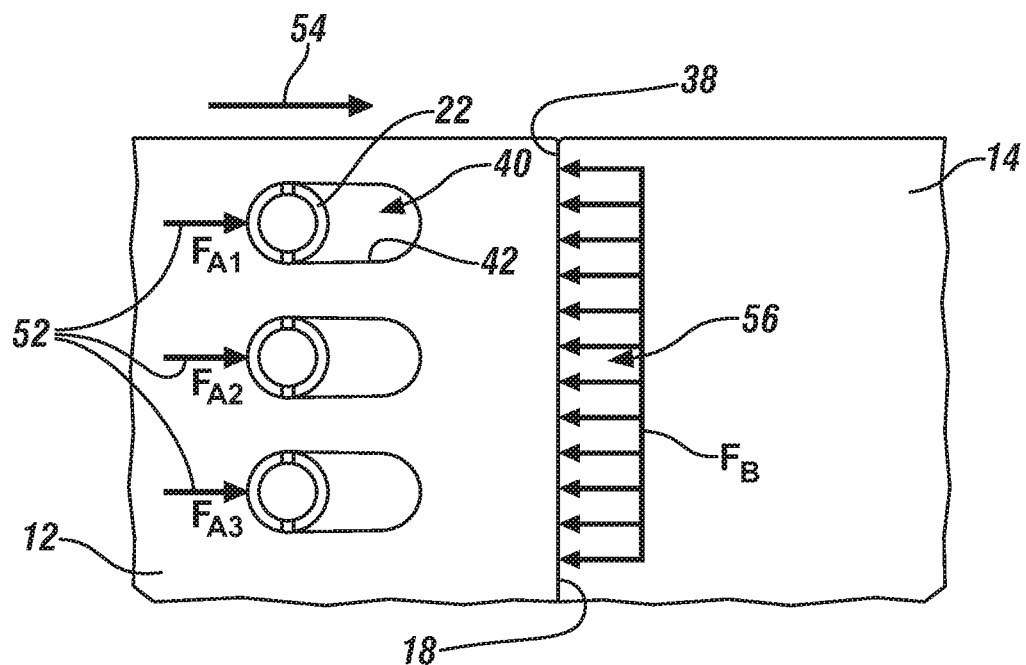
FIG. 5 is a force diagram of the jointed components in the engaged position.
Figure 6:
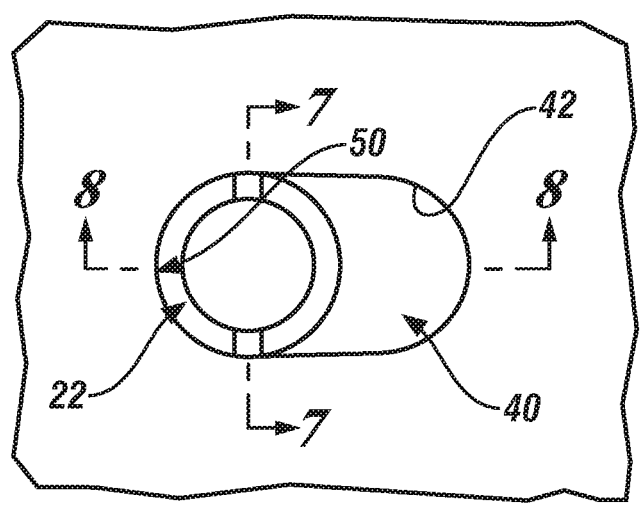
FIG. 6 is a top plan view of a protrusion engaged with an aperture.
Figure 7:
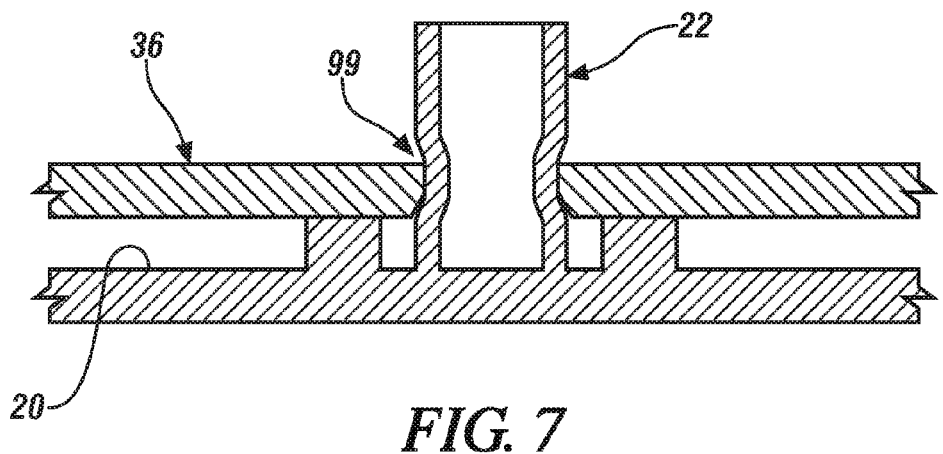
FIG. 7 is a cross-sectional view of the protrusion engaged with the aperture taken along line 7-7 of FIG. 6.
Figure 8:
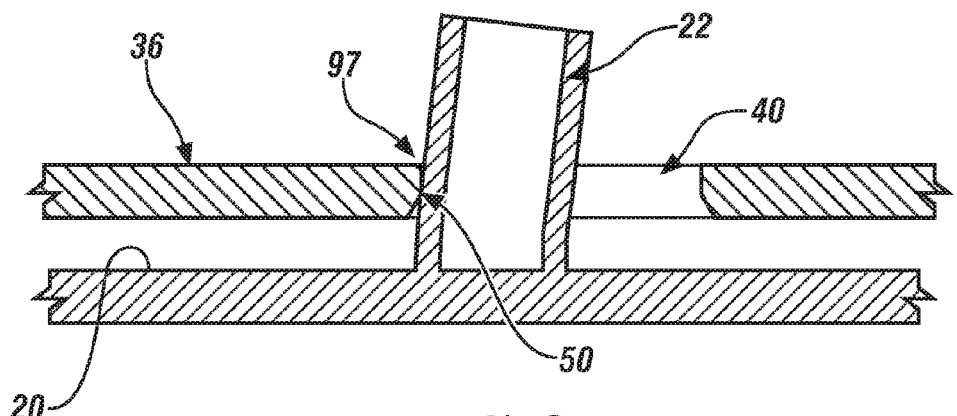
FIG. 8 is a cross-sectional view of the protrusion engaged with the aperture taken along line 8-8 of FIG. 6.

As shown in FIGS. 6-8, a bending aspect 97 and compression aspect 99 is achieved upon insertion of the elastically deformable protrusions 22 into the apertures 40. The elastically deformable protrusion 22 compresses (FIG. 7) on the two sides with interference and bends (FIG. 8) at the end region 50 (FIG. 3) of the aperture 40. As noted above, the bending of the protrusions produces an opposing force $F_A$ to that of the opposing total force distribution $F_B$, 56 (FIG. 5). In this way, the protrusions act as a spring to keep the first interface edge 18 and the second interface edge 38 in tight contact.

With continued reference to FIGS. 3 and 4, the retaining functionality of the first clip 28 and the second clip 30 is exemplified. The first clip 28 extends through a clip retaining slot 60 defined by the end portion 36 of the second component 14. The first clip 28 includes at least one, but typically a pair of oppositely disposed clip features 62 configured to engage the second component 14 at the end portion 36 proximate a perimeter of the clip retaining slot 60. The oppositely disposed clip features 62 resiliently deflect upon insertion of the first clip 28 through the clip retaining slot 60 until the first clip 28 is fully inserted, at which point the oppositely disposed clip features 62 each move outwardly to engage and retain the end portion 36 of the second component 14. Additional retaining of the second component 14 proximate the end portion 36 is accomplished with the second clip 30. The second clip 30 engages a surface 37 of the end portion 36 to retain the second component 14 between the main face 20 of the first main body portion 16 and the second clip 30. It is to be appreciated that the jointed assembly 10 may include any number of the first clip 28 and/or the second clip 30. Regardless of the precise arrangement and number of clips, a "snap-fit" engagement between the first component 12 and the second component 14 is provided. It is contemplated that the second component 14 and the first component 12 are removably engaged with each other.

As will be apparent from the description herein, the elastically deformable nature of the elastically deformable protrusions 22, in combination with the particular orientations described above, facilitates precise alignment of the first component 12 with the second component 14, and more particularly between the first interface edge 18 and the second interface edge 38.

Any suitable elastically deformable material may be used for the elastically deformable protrusions 22. The term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Numerous examples of materials that may at least partially form the components include various metals, polymers, ceramics, inorganic materials or glasses, or composites of any of the aforementioned materials, or any other combinations thereof Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS), such as an ABS acrylic. The material may be in any form and formed or manufactured by any suitable process, including stamped or formed metal, composite or other sheets, forgings, extruded parts, pressed parts, castings, or molded parts and the like, to include the deformable features described herein. The material, or materials, may be selected to provide a predetermined elastic response characteristic of the elastically deformable protrusions 22. The predetermined elastic response characteristic may include, for example, a predetermined elastic modulus.

Assembly of the first component 12 and the second component 14 is facilitated by engagement of the first interface edge 18 and the second interface edge 38 at an angle, followed by rotation of the first component 12 and/or the end portion 36 of the second component 14 toward each other. Rotation continues until the elastically deformable protrusions 22 fully engage the apertures 40. The precise position where engagement between the elastically deformable protrusions 22 and the apertures 40 occur will vary depending on positional variance imposed by manufacturing factors. Due to the elastically deformable properties of the elastic material comprising the elastically deformable protrusions 22, the criticality of the initial location of engagement is reduced. Further insertion of the elastically deformable protrusions 22, as well as the first clip 28 and the second clip 30, ultimately leads to a fully engaged position of the jointed assembly 10.

The elastic deformation of the plurality of elastically deformable protrusions elastically averages any positional errors of the first component 12 and the second component 14. In other words, gaps and/or misalignment that would otherwise be present due to positional errors associated with portions or segments of the first component 12 and the second component 14, particularly locating and retaining features. Specifically, the positional variance of each elastically deformable protrusion is offset by the remaining protrusions to average in aggregate the positional variance of each component.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187,675, the disclosure of which is incorporated by reference herein in its entirety. The embodiments disclosed herein provide the ability to convert an existing component that is not compatible with the described elastic averaging principles to an assembly that does facilitate elastic averaging and the benefits associated therewith.

Figure 9:
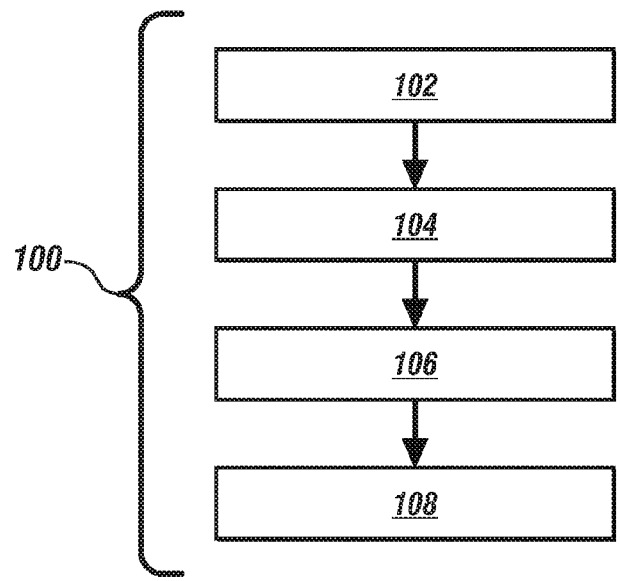
FIG. 9 is a flow diagram illustrating a method of reducing a joint gap between jointed components.
Figure 10:
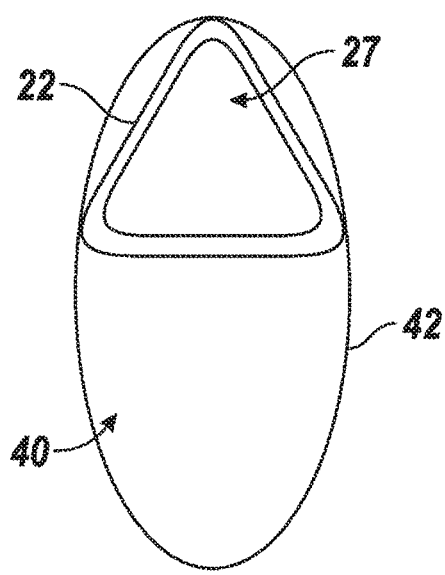
FIG. 10 is a schematic view of the first component engaged with the second component according to another embodiment of the invention.

A method of reducing a joint gap between jointed components 100 is also provided, as illustrated in FIG. 9, and with reference to FIGS. 1-8. The jointed assembly 10, and more specifically the elastically deformable nature of the elastically deformable protrusions 22, has been previously described and specific structural components need not be described in further detail. The method 100 includes positioning 102 the first interface edge 18 in close proximity with the second interface edge 38. The plurality of elastically deformable protrusions 22 are engaged 104 with the plurality of apertures 40, wherein the engagement is proximate the end region 50 of the aperture wall 42. The engagement referred to is a hard contact having stored energy, thereby forcing the first component 12 and the second component 14 into contact with each other. The plurality of elastically deformable protrusions 22 are elastically deformed 106 upon engagement of the plurality of elastically deformable protrusions 22 with the plurality of apertures 40. The first interface edge 18 and the second interface edge 38 are engaged 108 into a tight, fitted engagement.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastic retaining arrangement for jointed components comprising:
    a first component having a first main body portion and a first interface edge;
    a second component operatively coupled to the first component, the second component comprising a second main body portion, a second interface edge in contact with the first interface edge, and an end portion in an overlapped configuration with the first main body portion of the first component;
    an aperture extending through the end portion of the second component and defined by an aperture wall; and
    an elastically deformable protrusion extending from the first main body portion of the first component, the elastically deformable protrusion configured to fittingly engage the aperture proximate an end region of the aperture wall, wherein the elastically deformable protrusion is formed of an elastically deformable material and configured to elastically deform upon engagement with the aperture wall;
    the elastic retaining arrangement comprising a carpet retainer and a mating trim panel disposed in a vehicle.

2. The elastic retaining arrangement of claim 1, wherein the elastically deformable protrusion is a tubular member having a hollow portion.

3. The elastic retaining arrangement of claim 2, wherein the tubular member comprises a sloped region proximate a distal end of the tubular member.

4. The elastic retaining arrangement of claim 1, wherein the aperture comprises a slot having a slot width, and wherein the elastically deformable protrusion comprises a protrusion width greater than the slot width.

5. The elastic retaining arrangement of claim 1, further comprising a plurality of elastically deformable protrusions and a plurality of apertures, the plurality of apertures defined by a plurality of aperture walls.

6. The elastic retaining arrangement of claim 5, further comprising a fully engaged position of the first interface edge and the second interface edge, wherein an amount of deformation of the plurality of elastically deformable protrusions is averaged in aggregate relative to each other.

7. The elastic retaining arrangement of claim 6, wherein the fully engaged position comprises a retaining force exerted on each of the plurality of elastically deformable protrusions by the end region of each of the plurality of aperture walls.

8. The elastic retaining arrangement of claim 5, wherein each of the plurality of elastically deformable protrusions is integrally formed with a main face of the first component.

9. The elastic retaining arrangement of claim 1, further comprising a first clip operatively coupled to, and extending from, the first main portion of the first component.

10. The elastic retaining arrangement of claim 9, wherein the first clip extends through a clip retaining slot of the second component and engages the end portion of the second component.

11. The elastic retaining arrangement of claim 1, further comprising a second clip operatively coupled to the first component and configured to retain the end portion of the second component.

12. The elastic retaining arrangement of claim 1, wherein the elastically deformable protrusion comprises a circular tubular member.

13. The elastic retaining arrangement of claim 1, wherein the elastically deformable protrusion comprises a triangular tubular member.

* * * * *